April 16, 1929.   A. DE CONINCK   1,709,661
BRAKING SYSTEM
Original Filed June 10, 1920
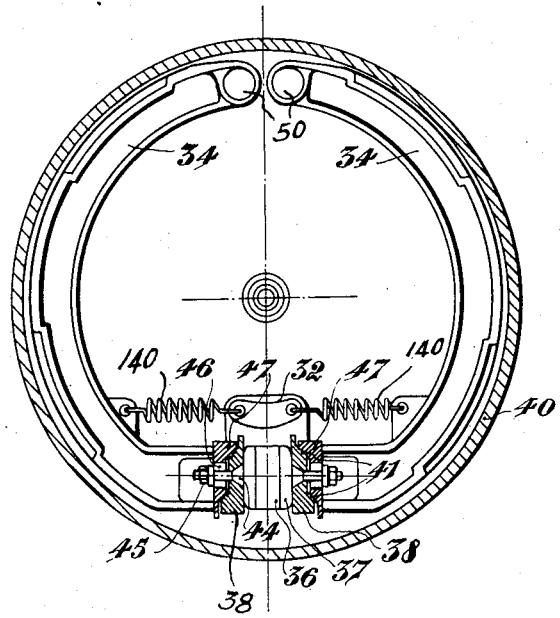
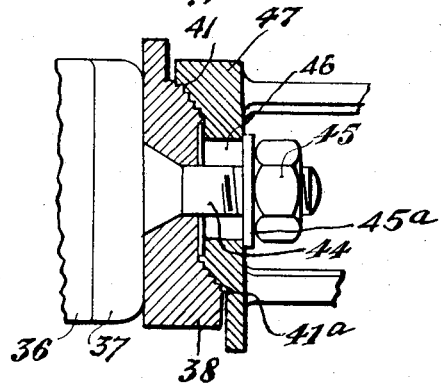
Inventor
Arthur De Coninck
By
B. Singer, Atty.

Patented Apr. 16, 1929.

1,709,661

UNITED STATES PATENT OFFICE.

ARTHUR DE CONINCK, OF BRUSSELS, BELGIUM.

BRAKING SYSTEM.

Original application filed June 10, 1920, Serial No. 388,055, and in Germany October 21, 1918. Divided and this application filed March 31, 1924. Serial No. 703,231.

This invention relates to improvements in automobile brakes, and especially with reference to the provision of wear take-up devices of improved construction, applicable to brakes for the purpose of taking up or compensating for the wear of the segments, as hereinafter shown and described.

The present invention is a divisional application of applicant's copending application for Letters Patent of the United States for improvements in braking system, filed December 12, 1921, Ser. No. 521,878, and his application Ser. No. 388,055, filed June 10, 1920, which has resulted in Patent No. 1,412,104 dated April 11, 1922.

It is known to compensate the wear of the brake shoes especially for automobiles by providing on the brake shoes special compensating devices, but these known devices have the disadvantage, that the braking powers effect also the compensating elements and especially the screws or bolts which carry the compensating blocks, so that the brake shoes have to be renewed very often on account of the destruction of the compensating device before they are worn out.

According to the invention these disadvantages are eliminated by providing at the end of each brake shoe a pressure block having step shaped offsets and being connected by a bolt to a similarly shaped reversed block. This last named block is engaged by the expansion member of the brake. Through such an arrangement the connecting bolt is neither submitted to the brake pressure nor to any shearing stress and will be always in good condition.

The drawings represent one form of the invention.

Fig. 1 is a front view of the brake mechanism, and

Fig. 2 is a section through the compensating device in a bigger scale.

The invention as here shown has a brake drum 40 and brake jaws or shoes 34 which are arranged in said drum and pivoted, each at its inner end, as at 50 to be brought into engagement with the inner periphery of said drum and which are normally pulled away from the drum 40 by springs 140 which are fastened to a common middle piece, 32. The brake shoes are sustained against the pressure of the springs by means of an expansion member 36 having a cylindrical surface 37 and pressure blocks 38, 47. Said blocks 47 are on the opposing free ends of the brake shoes and are provided on their opposing faces with step shaped offsets 41. The blocks 38 are similar, but reversed with respect to the blocks 47, and have step shaped offsets 41ª which engage the offsets 41. A bolt 44 passes through and has a head embedded in each block 38, the shank of each bolt passing through an enlarged opening 46 in the center of the associated block 47 and being provided with a nut 45 and a washer 45ª as shown. Hence the blocks 38 are held tightly pressed against the blocks 47. When a brake shoe becomes worn its nut 45 can be loosened and the block 38 then moved relatively to the block 47 to compensate for wear. The opening 46 is of sufficient diameter to permit such block movement, and the nut is then again tightened.

Having thus described my invention, I claim:

1. Device for compensating the wear of brake shoes especially in automobiles, comprising a pressure block on the ends of the brake shoes, provided with step-shaped offsets, a reversed similar block connected to the first named block by a bolt, the second block being engaged by the expansion member whereby the bolt is free of the effect of brake pressure and shearing strain.

2. Device for compensating the wear of brake shoes of automobiles and connecting pressure blocks on the ends of the brake shoes and having step-shaped off-sets, a reversed similar block connecting with each of the first named blocks, bolts forming the connections with said blocks, and an expansion member arranged between and engaged by the second named blocks and relieving the said bolts of the effect of brake pressure and shearing stress.

In witness whereof I affix my signature.

ARTHUR DE CONINCK.